(12) United States Patent
Drude

(10) Patent No.: US 8,559,483 B1
(45) Date of Patent: Oct. 15, 2013

(54) SIGNAL QUALITY MONITOR

(75) Inventor: Stefan Drude, Waalre (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/433,510

(22) Filed: Mar. 29, 2012

(51) Int. Cl.
*H04B 1/00* (2006.01)

(52) U.S. Cl.
USPC ......... 375/150; 324/76.33; 342/189; 375/130

(58) Field of Classification Search
None
See application file for complete search history.

(56) References Cited

U.S. PATENT DOCUMENTS

2010/0316095 A1* 12/2010 Simic et al. .................. 375/150
2013/0063302 A1* 3/2013 Krasner et al. ........... 342/357.29

OTHER PUBLICATIONS

Proakis, J. G.; "Digital Communications," McGraw Hill, Inc., cover pg, title pg., pp. 800-807, 831-837 (1995).

Challapali, K., et al. "Spectrum Agile Radio: Detecting Spectrum Opportunities," Intl. Symp. on Advanced Radio Techniques, 5 pgs. (2004).
Dixon, R.C.; "Spread Spectrum Systems," John Wiley & Sons, pp. 15-21, 71-79 (1984).
Viterbi, A.J.; "CDMA—Principles of Spread Spectrum Communication," Addison-Wesley Publishing Co., cover pg, title pg., pp. 23-26, 40-44 (1995).

* cited by examiner

*Primary Examiner* — Adolf Dsouza

(57) ABSTRACT

Various embodiments relate to a method of determining the presence of a spread spectrum signal, including: receiving N input samples of a signal; performing a first autocorrelation on the N input samples with a first offset; performing a second autocorrelation on the N input samples with a second offset; performing a third autocorrelation on the N input samples with a third offset; performing a fourth autocorrelation on the N input samples with a fourth offset; performing a fifth autocorrelation on the N input samples with a fifth offset; determining if the values of the first, second, and third autocorrelations are decreasing, and determining if the values of the fourth and fifth autocorrelations are less than a threshold value, then determining that a spread spectrum signal is present in the N input samples.

20 Claims, 3 Drawing Sheets

SIGNAL QUALITY MONITOR

TECHNICAL FIELD

Various exemplary embodiments disclosed herein relate generally to determining the presence of a spread spectrum signal in a communication system.

BACKGROUND

Various communications systems use direct sequence spread spectrum modulation to transmit data between a transmitter and a receiver. Some of these systems use relatively short spreading codes to transmit the information such as IEEE 802.15.4 "Zigbee" or IEEE 802.11b "Wireless LAN". In these communications systems, the information to be sent is coded in the polarity of the spreading code: a logical "1" is coded in the spreading sequence being sent in true polarity while a logical "0" is sent in inverse polarity. Common to these systems is the fact that the wanted signal may be below the thermal noise level at times, however, due to the spreading gain inherent in the de-spreading process the receiver will still be able to recover the transmit information.

There are applications where direct sequence spread spectrum methodology may be used that employ a relatively low duty cycle, i.e., the transmitter sends information only from time to time. An example may be a wireless long distance remote access system. Such a system would have the receiver scan or poll for messages from the transmitter regularly, however, given the low duty cycle of the messages to be sent, the receiver will not see any actual messages coming in from the transmitter during most of the time. In such a case, it may be useful to find out if there is any actual direct sequence spread spectrum signal present so as to either continue the reception process or abort the scan/poll process. Further, it would be useful to detect any loss of incoming signal while trying to receive a message after a working wireless communication link had initially been established between transmitter and receiver.

SUMMARY

Accordingly, there is a need for a system and method that quickly and efficiently may determine the presence of a spread spectrum signal. If a spread spectrum signal is not present, then a receiver may turn off for a period of time to conserve resources.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may also relate to a method of determining the presence of a spread spectrum signal, including: receiving N input samples of a signal; performing a first autocorrelation on the N input samples with a first offset; performing a second autocorrelation on the N input samples with a second offset; performing a third autocorrelation on the N input samples with a third offset; performing a fourth autocorrelation on the N input samples with a fourth offset; performing a fifth autocorrelation on the N input samples with a fifth offset; determining if the values of the first, second, and third autocorrelations are decreasing, and determining if the values of the fourth and fifth autocorrelations are less than a threshold value, then determining that a spread spectrum signal is present in the N input samples.

Various embodiments may also relate to a system that determines the presence of a spread spectrum signal, including: N delay lines receiving input samples arranged to produce N delayed input samples; N+1 multipliers with an output, wherein the N+1 multipliers receive an input sample as a first input, wherein the first multiplier receives the input sample as a second input, and wherein the second to N+1 multipliers each receive a delayed input sample from each of the N delay lines; N+1 accumulators each accumulating the outputs of one the N+1 multipliers; a signal presence determiner coupled to the N+1 accumulators, wherein the signal presence determiner determines the presence of a spread spectrum signal based upon the outputs of the N+1 accumulators.

BRIEF DESCRIPTION OF THE DRAWINGS

In order to better understand various exemplary embodiments, reference is made to the accompanying drawings wherein.

DETAILED DESCRIPTION

Figure 1:
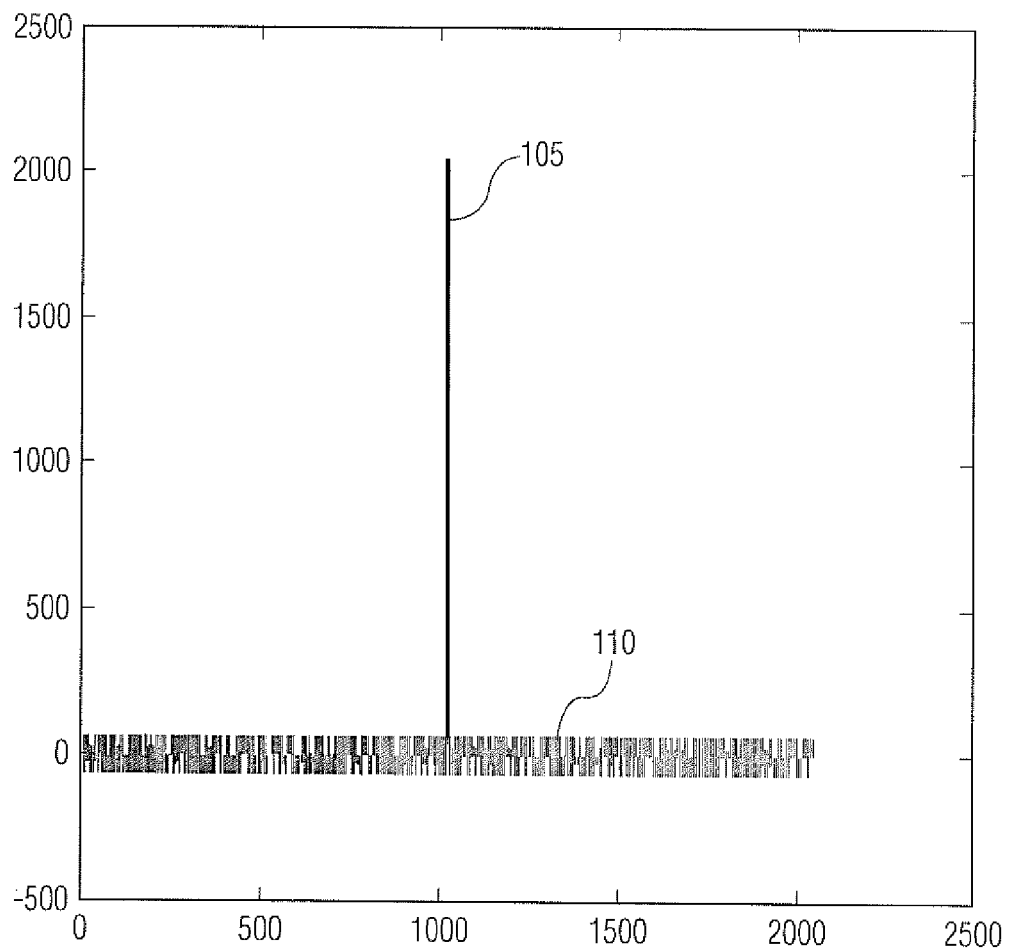
FIG. 1 is a plot illustrating an auto correlation function of a spread spectrum signal using a Gold code of length 2047.

Referring now to the drawings, in which like numerals refer to like components or steps, there are disclosed broad aspects of various exemplary embodiments.

A direct sequence spread spectrum (DSSS) signal is a commonly used type of spread spectrum signal. A DSSS signal will be used as an example of a spread spectrum signal in the description of embodiments below. This is not intended to limit these embodiments to DSSS signals, but rather these embodiments may be used with other types of spread spectrum signals.

A test for the presence of a desired DSSS input signal may be based on the known properties of the autocorrelation function of the expected input signal. The test may simply work on the incoming data samples and may not require any synchronization to the spreading code sequence to work well. The idea behind this method may be to compute the autocorrelation function of the incoming data samples for a window of limited size and compare the results against the known pattern of the autocorrelation function over the same window for the desired DSSS input signal. Of course this assumes that any unwanted interferer will not be able to produce an autocorrelation function result, which matches the autocorrelation function of the desired DSSS input signal.

Accordingly, it may be possible to compute the autocorrelation function only for a number of points of interest and not over the entire length of the chosen spreading code sequence. This will be shown with respect to FIGS. 1 and 2 below. This may help to limit the extra hardware and/or software resources needed to implement the method.

FIG. 1 is a plot illustrating an auto correlation function of a spread spectrum signal using a Gold code of length 2047. As can be seen in FIG. 1 there is a very sharp mainlobe 105 and low sidelobes 110. The peak of the mainlobe reaches 2047, which is the length of the spreading code (including oversampling if employed), in this example perfect correlation occurs at zero offset. Outside the mainlobe region 110, the autocorrelation function has a very low value.

Figure 2:
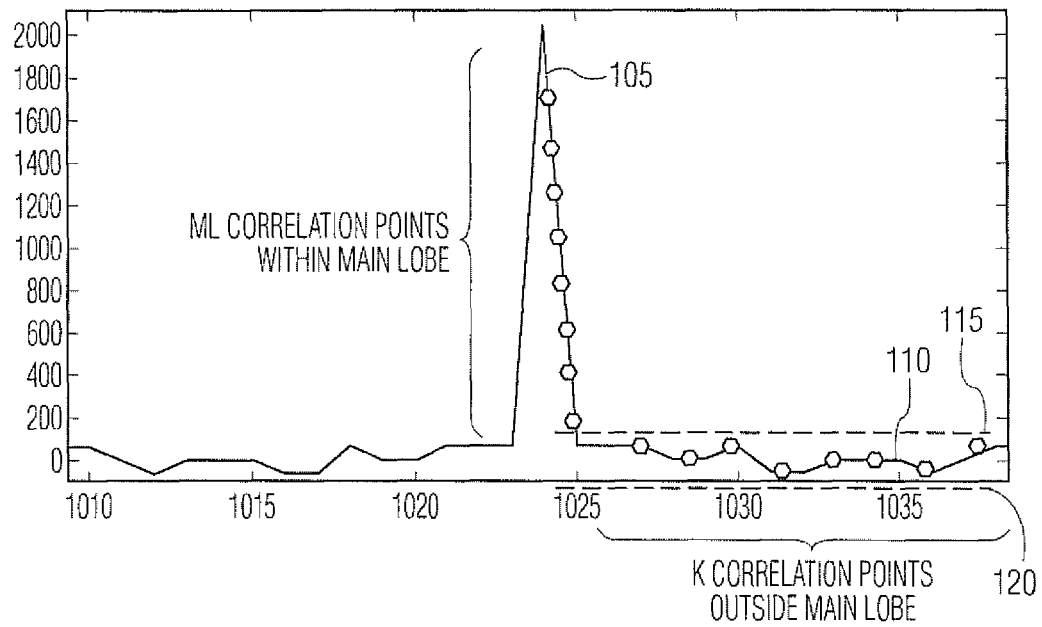
FIG. 2 is the plot illustrating the shape of the mainlobe of an auto correlation function of a spread spectrum signal using a Gold code of length 2047 as shown in FIG. 1.

FIG. 2 is the plot illustrating the shape of the mainlobe of an auto correlation function of a spread spectrum signal using a Gold code of length 2047 as shown in FIG. 1. FIG. 2 illustrates the fact that the mainlobe 105 actually has a triangular shape due to oversampling of the DSSS signal. FIG. 2 further illustrates that outside the mainlobe 105, the sidelobes 110 have a limited magnitude. It is these characteristics of the autocorrelation function that may be used to efficiently determine the presence of a DSSS signal. For example, threshold values 115 and 120 are illustrated. These threshold values 115 and 120 bound the range of the expected sidelobe values of the autocorrelation function. In the alternative, the threshold values may be a single absolute magnitude value that may be compared to the magnitude of the sidelobe values of the autocorrelation function.

For a DSSS signal with an oversampling ratio of, for example, 3× or 6×, a method may be used to capture the shape of the triangle around zero offset of a DSSS signal autocorrelation function and then verify that the measured autocorrelation function has a value close to zero at distances away from the zero offset, for example, distances corresponding to five and/or eight chips from the offset. The hardware required to implement this method may include a delay line for the desired offsets and one complex multiplier and accumulator unit for each point of the autocorrelation function that may be observed. Further, the method may use a sufficiently wide accumulator to compute the autocorrelation results for the desired width of the correlation window. The width of the correlation window may be chosen such that the signal to noise ratio for a desired input signal may be positive with a comfortable margin. For an example of a spreading code of length 225 chips and an oversampling ratio of 3×, the window size might be chosen to be 1350 samples (or two data bit periods).

Figure 3:
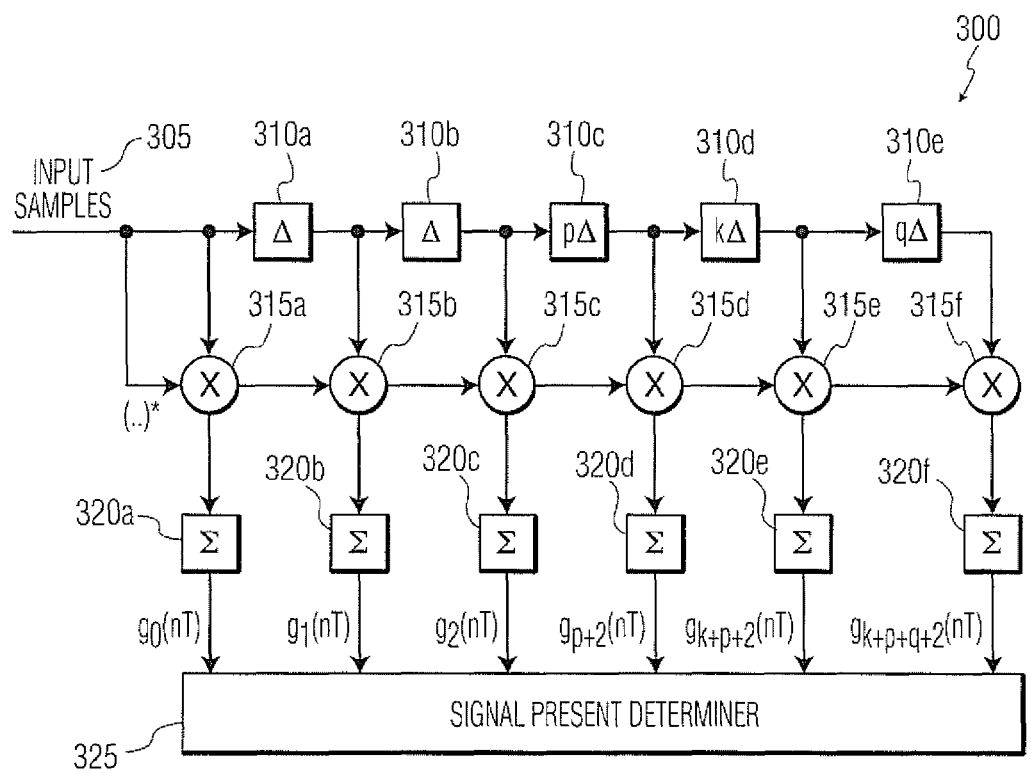
FIG. 3 is a block diagram illustrating a system that determines the presence of a spread spectrum signal.
Figure 4:
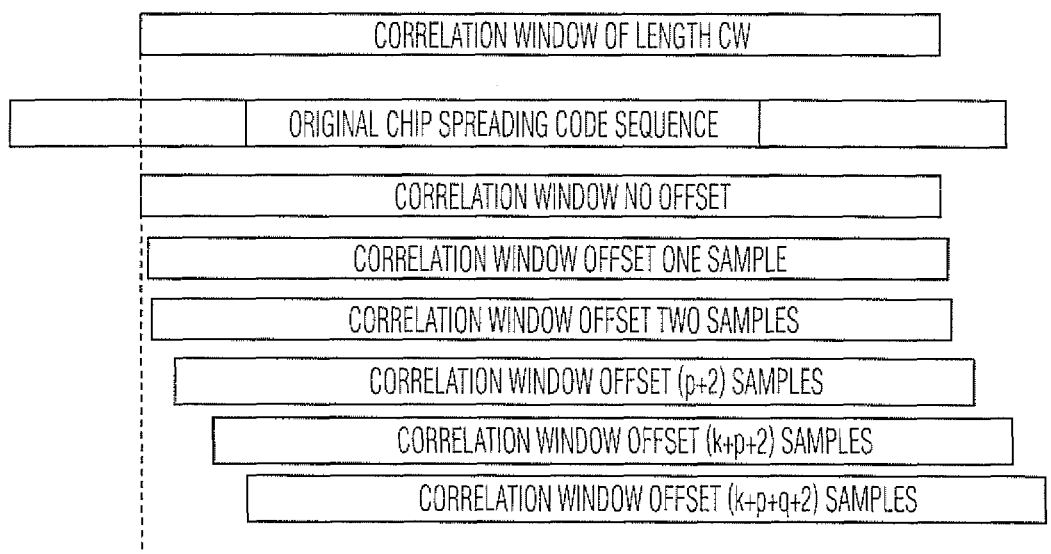
FIG. 4 is a diagram illustrating correlation windows used for determining the presence of a spread spectrum signal.

FIG. 3 is a block diagram illustrating a system that determines the presence of a spread spectrum signal. FIG. 4 is a diagram illustrating correlation windows used for determining the presence of a spread spectrum signal. FIG. 4 also illustrates the data structure of the incoming data stream and the relative position of proposed windows used to perform the autocorrelation. The position of the correlation windows may be arbitrary and may not be aligned with the start of the spreading code sequence.

The system 300 may include: delay lines 310a, 310b, 310c, 310d, and 310e; multipliers 315a, 315b, 315c, 315d, 315e, and 315f; accumulators 320a, 320b, 320c, 320d, 320e, and 320f; and signal presence determiner 325. The system 300 may receive input samples 305. The input samples move through the delay lines 310 where the input samples are delayed by various amounts: $\Delta$, $\Delta$, $p\Delta$, $k\Delta$, and $q\Delta$, where $\Delta$ is a time delay based upon the sampling rate of the input samples and p, k, and q are integers. The complex conjugate of current input sample may be applied to each of the multipliers 315. If the input samples are only real valued then the complex conjugate of the input sample is the same as the input sample. The other input to the multipliers are the delayed input samples based upon the amount of delay applied by the various delay lines 310. The outputs of the multipliers 315 are applied to accumulators 320 which sum the outputs received from the multipliers 315. Once all of the input samples in the correlation window have been processed, the accumulators output autocorrelation function results $g_0(nT)$, $g_1(nT)$, $g_2(nT)$, $g_{p+2}(nT)$, $g_{k+p+2}(nT)$, and $g_{k+p+q+2}(nT)$. These autocorrelation function results are applied to signal presence determiner 325.

The signal presence determiner 325 may apply the following tests to the autocorrelation function results in order to positively identify a desired signal. First, the autocorrelation function results for the first mainlobe correlation points need to be in descending order, i.e., $g_0(nT)$, $g_1(nT)$, and $g_0(nT)$ must be in descending order. This corresponds to the triangle portion of the mainlobe as shown above in FIG. 2. Next, the autocorrelation function results for the K correlation points outside the mainlobe need to be within a predetermined threshold range, i.e., $g_{p+2}(nT)$, $g_{k+p+2}(nT)$, and $g_{k+p+q+2}(nT)$. Alternatively, if only the magnitude of the autocorrelation function results are used, then the threshold is a single value that the results must be below. If both of these conditions are met, then the signal presence determiner may indicate the presence of a DSSS signal. The signal presence determiner may operate on as few as two mainlobe correlation points and two correlation points outside the mainlobe. While more points may provide more reliable determination of the presence of a DSSS signal, it may increase the amount of processing and resources needed. Therefore, a balance between these competing needs may be made in order to select the desired number of points to calculate for any give environment, application, and design.

While the system 300 has been discussed as implemented in hardware, the system may also be implemented using software in a computer or processor. The processor may be a general purpose processor, a graphic processor, or a signal processing element, or any other type of computing device. Further, the system 300 may be implemented as an integrated circuit.

The following discussion provides specific mathematical details of the method. Although in this analysis the signals are all shown as real signals, the actual implementation may accommodate complex input signals.

As described above, the method computes the autocorrelation function of the input data with itself for a number of specific offsets that would reflect points of interest for the input DSSS signal that is expected. The correlation may be computed over an arbitrary correlation window size of length M samples. The size M may be chosen such that it is at least as large as a single data bit, e.g., 675 samples for a 225 chip spreading sequence length with 3× oversampling. This correlation window does not have to be aligned with the data frame structure of the incoming data stream, Although the computations are basically the same regardless of which output may be observed, the first output, $g_0(nT)$ may be analyzed separately from all the others for convenience. For the correlation point with zero offset, $g_0(nT)$:

$$g_0(nT) = \sum_{i=0}^{M-1} (s(T_0+iT)+n(T_0+iT))(s(T_0+iT)+n(T_0+iT)) \quad (1)$$

In equation (1) $T_0$ is an arbitrary offset, where the computation of the correlation starts.

After some rearranging a more insightful representation for interpretation results:

$$g_0(nT) = \sum_{i=0}^{M-1} s^2(T_0+iT) + \sum_{i=0}^{M-1} n^2(T_0+iT) + 2\sum_{i=0}^{M-1} s(T_0+iT)n(T_0+iT) \quad (2)$$

The first term represents the value of the autocorrelation function of the input signal s(nT) with zero offset or the power of the wanted input signal. The second term reflects the power of the (thermal) noise contained in the input stream. The third term reflects the cross-correlation of the wanted input signal and the noise and on average should vanish as the wanted signal and the noise input are not correlated.

The result $g_0(nT)$ will directly reflect the signal to noise ratio, and for negative signal to noise ratios the result $g_0(nT)$ will primarily reflect the input noise level. In particular from equation (2), it is noted that $g_0(nT)$ will not enjoy spreading gain according to the spreading factor used.

It should further be noted that the result in (2) is different from the output of a classical matched filter tuned to the desired input signal $s(nT)$, which does not contain the $n^2()$ term and includes only one of the cross-terms.

For all other offsets the following equations result:

$$g_k(nT)=\Sigma_{i=0}^{M-1}(s(T_0+iT)+n(T_0+iT))(s(T_0+iT+k\Delta)+n(T_0+iT+k\Delta)) \quad (3)$$

Breaking up the product summation into individual summations produces the following four components in the correlation result $gk(nT)$:

$$g_{k,1}(nT)=\Sigma_{i=0}^{M-1}s(T_0+iT)s(T_0+iT+k\Delta) \quad (4)$$

$$g_{k,2}(nT)=\Sigma_{i=0}^{M-1}s(T_0+iT)n(T_0+iT+k\Delta) \quad (5)$$

$$g_{k,3}(nT)=\Sigma_{i=0}^{M-1}s(T_0+iT+k\Delta)n(T_0+iT) \quad (6)$$

$$g_{k,4}(nT)=\Sigma_{i=0}^{M-1}n(T_0+iT)n(T_0+iT+k\Delta) \quad (7)$$

The first term, equation (4), corresponds to the value of the autocorrelation function of the desired input signal $s(nT)$ at offset $k\Delta$. This component allows the method to take advantage of the a-priori knowledge of the autocorrelation properties of the desired spread spectrum input signal. As before, equation (4) does not give any indication that there may be any benefit from spreading gain. The second and third terms, equations (5) and (6), correspond to the cross-correlation of the wanted signal and the noise and on average should vanish. The forth term, equation (7), is the value of the autocorrelation function of the noise input and for white Gaussian noise assumed here should also vanish on average.

Similar calculations may be used when the input signal is complex and not real valued. In such a case, the complex input samples may be multiplied with the complex conjugate time delayed signals, and all multiplications will be complex. As for the time delays to choose, the ML mainlobe correlation computations may be carried out within the mainlobe of the autocorrelation function of the desired input signal, i.e., within one chip offset, and K correlation computations outside this mainlobe. The delays corresponding to the K computations outside this mainlobe may be placed at distances that are not equal. This may provide the benefit of preventing sinusoidal interference from correlating in the sidelobe region.

The correlation window size M may be chosen such that sufficiently high margin against thermal noise input may be ensured for the targeted system. The specific size may depend on the actual application.

The embodiments described above may be applied in any wireless communications system which employs direct sequence spread spectrum methodology with relatively short spreading sequences. Typical examples include wireless long distance remote access systems (automotive applications), wireless sensor networks, remote meter reading, home automation. Further, these embodiments may be applied to other spread spectrum signal systems.

The method for determining the presence of a spread spectrum signal may be used to determine the presence of the spread spectrum signal before synchronization of the signal is accomplished. This allows for fewer resources to be used in receiver hardware and/or software until an actual spread spectrum signal is found to be present. At that time, full acquisition and synchronization of the spread spectrum signal may begin. Further, the method may be used to determine the continued presence of a spread spectrum signal in an established communication link utilizing a spread spectrum signal. Once the spread spectrum signal has been found to have been absent for a specified period of time, the communication link may be terminated, and hardware and software resources conserved. Accordingly, this method may lead to reduced power usage in communication systems, especially those that have infrequent communication.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A method of determining a presence of a spread spectrum signal, comprising:
   receiving N input samples of a signal;
   performing a first autocorrelation on the N input samples with a first offset;
   performing a second autocorrelation on the N input samples with a second offset;
   performing a third autocorrelation on the N input samples with a third offset;
   performing a fourth autocorrelation on the N input samples with a fourth offset;
   performing a fifth autocorrelation on the N input samples with a fifth offset;
   determining if values of the first, second, and third autocorrelations are decreasing;
   determining if values of the fourth and fifth autocorrelations are less than a threshold value; and
   determining that the spread spectrum signal is present in the N input samples when both the values of the first, second, and third autocorrelations are decreasing and the values of the fourth and fifth autocorrelations are less than the threshold value.

2. The method of claim 1, further comprising:
   performing a sixth autocorrelation on the N input samples with a sixth offset; and
   determining if a value of the sixth autocorrelation is less than the threshold value.

3. The method of claim 2, wherein a difference between the fourth and fifth offset is different than a difference between the fifth and the sixth offset.

4. The method of claim 1, wherein the spread spectrum signal is a direct sequence spread spectrum signal.

5. The method of claim 1, wherein the spread spectrum signal is oversampled.

6. The method of claim 1, wherein the first autocorrelation is done over a window that has a window size greater than a data bit length of codes used in the spread spectrum signal.

7. The method of claim 1, wherein the first autocorrelation is done over a window that has a window size greater than twice a data bit length of codes used in the spread spectrum signal.

8. The method of claim 1, wherein the input samples are complex values.

9. The method of claim 1, further comprising:
beginning synchronization of the spread spectrum signal if a spread spectrum signal is present.

10. The method of claim 1, further comprising:
terminating a communication link using the spread spectrum signal if the spread spectrum signal is not present for a period of time.

11. The method of claim 1, wherein the first, second, and third offsets correspond to a mainlobe region of an autocorrelation function and wherein the fourth and fifth offsets correspond to a sidelobe region of the autocorrelation function.

12. The method of claim 11, wherein the autocorrelation function has a triangular shape in the mainlobe region.

13. The method of claim 1, further comprising:
comparing the threshold value to a magnitude of sidelobe values of an autocorrelation function.

14. A system that determines a presence of a spread spectrum signal, comprising:
M−1 delay lines configured to receive input samples to produce M−1 delayed input samples;
M multipliers with an output, wherein the M multipliers are configured to receive an input sample as a first input, a first multiplier is configured to receive the input sample as a second input, and subsequent multipliers are each configured to receive a delayed input sample from each of the M−1 delay lines;
M accumulators, each accumulator configured to accumulate respective outputs of one of the M multipliers; and
a signal presence determiner coupled to the M accumulators, configured to determine the presence of the spread spectrum signal based upon the outputs of the M accumulators based on a plurality of autocorrelations performed on the input samples using a plurality of offsets, wherein the presence is determined when values in a first group in the plurality of autocorrelations are decreasing and values in a second group in the plurality of autocorrelations are below a threshold value, wherein autocorrelations included in the first group are performed before autocorrelations in the second group and the first group includes at least three autocorrelations and the second group includes at least two autocorrelations.

15. The system of claim 14, wherein a contiguous first portion of the outputs of the M accumulators corresponds to the mainlobe region of the autocorrelation function of the spread spectrum signal and a contiguous second portion of the outputs of the M accumulators corresponds to the sidelobe region of the autocorrelation function of the spread spectrum signal.

16. The system of claim 15, wherein the signal presence determiner is configured to determine if values in the contiguous first portion of the outputs are decreasing, determine if values in the second contiguous portion of the outputs are less than a threshold value, and determine that a spread spectrum signal is present when both the values in the contiguous first portion are decreasing and the values in the contiguous second portion are less than the threshold value.

17. The system of claim 16, wherein the contiguous first portion comprises at least three values and the contiguous second portion comprises at least two values.

18. The system of claim 14, wherein the input samples are complex values.

19. The system of claim 14, wherein the system is implemented on an integrated circuit.

20. The system of claim 14, wherein the spread spectrum signal is a direct sequence spread spectrum signal.

* * * * *